United States Patent [19]

Somers et al.

[11] 4,190,860
[45] Feb. 26, 1980

[54] DIGITAL METHOD AND APPARATUS FOR ROTATING AN INFORMATION STORAGE DISK

[75] Inventors: Frank J. Somers, Santa Monica; John S. Winslow, Altadena, both of Calif.

[73] Assignee: MCA Discovision, Inc., Universal City, Calif.

[21] Appl. No.: 961,362

[22] Filed: Nov. 16, 1978

[51] Int. Cl.² .................. G11B 19/24; G11B 19/14
[52] U.S. Cl. .................. 358/128.5; 179/100.3 V; 179/100.4 C; 346/76 L; 360/73
[58] Field of Search .................. 358/128; 360/73; 179/100.1 S, 100.4 C, 100.4 D, 100.4 E, 100.3 V; 365/215; 346/76 L, 137, 108

[56] References Cited

U.S. PATENT DOCUMENTS

| | | | |
|---|---|---|---|
| 2,113,226 | 4/1938 | Young | 179/100.4 C |
| 2,901,737 | 8/1959 | Stovall, Jr. | 360/73 |
| 3,646,259 | 2/1972 | Schuller | 360/73 |
| 3,939,302 | 2/1976 | Kihara | 358/128 |
| 4,118,734 | 10/1978 | Bouwhuis et al. | 358/128 |
| 4,125,859 | 11/1978 | Oshida et al. | 358/128 |
| 4,142,210 | 2/1979 | Otobe et al. | 358/128 |

FOREIGN PATENT DOCUMENTS 2257817  5/1974  Fed. Rep. of Germany .... 179/100.1 S

Primary Examiner—Bernard Konick
Assistant Examiner—Donald E. McElheny, Jr.
Attorney, Agent, or Firm—Ronald J. Clark

[57] ABSTRACT

Method and apparatus for rotating an information storage disc about its central axis at a prescribed angular velocity that varies according to the radial position of an optical transducer for recording information thereon, whereby a uniformly high density of information can be recorded over the entire disc. The apparatus includes a register for storing a digital measure of the radius of the current track being recorded by the transducer, along with velocity signal circuitry for producing a disc velocity signal having a frequency inversely proportional to the measure of radius, and a spindle motor servo, responsive to the disc velocity signal, for controlling the angular velocity of the information disc, accordingly. The velocity signal circuitry includes a crystal oscillator, a counter for counting the clock pulses produced by the oscillator, and a digital word magnitude comparator for generating a reset pulse to reset the counter to an initial zero count every time it determines that the count is equal to the digital measure of radius. The disc velocity signal is then derived by frequency dividing the successive reset pulses.

23 Claims, 3 Drawing Figures

DIGITAL METHOD AND APPARATUS FOR ROTATING AN INFORMATION STORAGE DISK

BACKGROUND OF THE INVENTION

1. Field of the Invention

This invention relates generally to information storage discs and, more particularly, to apparatus for rotating an information disc relative to a radially movable transducer.

2. Description of the Prior Art

Discs for storing large quantities of video information have come into increasing usage in recent years as a result of an increasing need for storage media that provide instantaneous playback, fast random access, and relatively high recording density. The information is typically encoded on the disc in the form of an optically readable sequence of light-reflective and light-scattering regions arranged in substantially circular tracks forming a spiral or concentric circular pattern over the information-bearing surface of the disc.

Ordinarily, the light-reflective and light-scattering regions are initially formed in the disc using an optical transducer for directing onto the disc a collimated beam of high intensity light that is modulated by the information to be recorded. The disc is rotated about its central axis at a substantially constant angular velocity relative to the transducer, while the beam of light is moved radially with respect to the disc at a relatively slow, but constant, velocity. Each revolution of the disc thus results in the production of a separate information track. In the case of video signals, the disc is ordinarily rotated at approximately 1800 r.p.m., whereby each information track contains the information for one video frame.

Systems for encoding the discs at a constant angular velocity have not utilized all of the information storing capability of the discs, however, because the successive light-reflective and light-scattering regions forming information tracks near the periphery of discs are significantly larger in size than the corresponding regions forming tracks near the centers of the discs. As a result, the density of the recorded information is substantially less at the periphery of the disc than near the center of the disc.

Efforts have been made in the past to obtain a more uniform distribution of information over the surface area of the disc, by reducing the angular velocity of the disc as the radial position of the light beam increases. A uniform density of information can be produced if the angular velocity of the disc is made inversely proportional to the radius of the particular track being recorded, whereby the track being recorded on is moved at a constant linear velocity relative to the beam. If this is done, the nominal sizes of the successive light-reflective and light-scattering regions are the same for all of the information tracks.

An example of an analog system for rotating an information disc at a constant linear velocity relative to a beam of light is disclosed in a copending application for U.S. patent application Ser. No. 961,405, filed simultaneously herewith under the name W. R. Dakin et al and assigned to the same assignee as the present application, and entitled "Method and Apparatus for Rotating an Information Storage Disc". The disclosed system includes a movable lens carriage for directing a light beam onto a disc, with an associated potentiometer for producing a voltage signal proportional to the radius of the particular information track being recorded. This voltage signal is applied to a voltage-controlled-oscillator (VCO) to produce a disc velocity signal having a frequency proportional to the radius of the selected track. The velocity signal is, in turn, coupled to a spindle servo, which includes a spindle motor and an associated tachometer, for controllably synchronizing the frequency of the signal produced by the tachometer with the frequency of the velocity signal, whereby an angular velocity substantially proportional to the radius of the track being recorded will result.

Although constant linear velocity systems of the type described above do provide a more uniform density of recorded information over the surface of the disc than do constant angular velocity systems, and although they operate satisfactory in some situations, the systems are subject to non-linearities and drifts in the VCO along with inaccuracies in the voltage signal produced in the variable resistor. The density of the recorded information thus cannot be made as uniformly high as it would be if the system were not susceptible to such errors. Additionally, such constant linear velocity systems ordinarily require elaborate calibration procedures to be performed prior to their actual use.

Other systems for rotating an information disc at a substantially constant linear velocity relative to a light beam have eliminated the potentiometer and substituted for it a shaft encoder coupled to the movable lens carriage, a counter, and a digital-to-analog (D/A) converter. In these alternative systems, pulses produced by the shaft encoder are counted in the counter to produce a digital count proportional to the radius of the track being recorded. Application of this count to the input of the D/A converter, then, produces a corresponding analog signal than can be used in combination with a VCO and a spindle servo of the type previously described, to control the angular velocity of the disc. Such hybrid digital/analog systems still require elaborate calibrating procedures to be performed, and are still susceptible to non-linearities and drifts in the VCO. Additionally, such systems are limited by the resolution capability of D/A converters currently available commercially.

It will be appreciated from the foregoing that there is still a need for a method and apparatus for rotating an information disc at a precisely controllable angular velocity, whereby information can be recorded in a series of concentrically arranged tracks with a uniformly high recording density, without being susceptible to non-linearities and drifts of various elements in the apparatus, and without necessitating substantial initial calibration procedures. The present invention fulfills this need.

SUMMARY OF THE INVENTION

Basically, the invention is embodied in an improved apparatus and method for its use for precisely controlling the angular velocity of an information disc having a plurality of substantially circular and concentrically arranged information tracks. A transducer for either recording or playing back information from the disc is positioned in a prescribed relationship relative to a selected one of the tracks, and the angular velocity of the disc about its central axis is controllably varied according to the radius of the selected track. By decreasing the angular velocity of the disc as the radius increases, a greater density of information can be contained on the disc than if the angular velocity were maintained constant.

The apparatus includes a radius register for storing a digital measure of the radius of the selected information track, means for producing a velocity signal having a frequency that varies according to the radius measure, and means for adjusting the angular velocity of the disc according to the frequency of the velocity signal. In accordance with the invention, the disc velocity signal is produced by frequency dividing a clock signal, which is generated by a stable reference oscillator, by the digital measure of radius, whereby the frequency of the velocity signal is substantially immune to component drifts, and elaborate preliminary calibration procedures are obviated. By making the radius measure a digital count directly proportional to the radius of the selected information track, a constant linear velocity of the track relative to the transducer is produced, and a maximum recording density over the entire surface of the disc can be achieved.

More particularly, an apparatus constructed in accordance with the present invention is especially adaptable for use with an information disc mastering machine wherein information is recorded onto a disc by an optical transducer. The transducer produces a collimated beam of light, which is modulated with the information to be recorded, and which is directed by a focusing lens onto a selected portion the disc, as the disc is controllably rotated with respect to it. The lens is attached to a carriage that is movable in a radial direction by a lead screw to direct the light beam onto the selected track.

The means for producing the velocity signal preferably includes a digital counter that is continuously clocked by the clock signal from the reference oscillator, a digital magnitude comparator for comparing the count stored in the counter to the radius count stored in the radius register and for producing a pulse to reset the counter to an initial zero state every time it is determined that the two counts are equivalent. Since the time period between successive reset pulses will be directly proportional to the magnitude of the digital measure of radius, it will be appreciated that the frequency of the reset pulses is inversely proportional to the measure of radius. The velocity signal can thus be produced by frequency dividing the succession of reset pulses, whereby the frequency of the velocity signal is, likewise, inversely proportional to the magnitude of the radius measure.

In accordance with another aspect of the present invention, the apparatus further includes means for producing a lens carriage velocity signal having a frequency porportional to the desired radial velocity for the light beam, along with a lens carriage driver, responsive to the lens carriage velocity signal, for controllably adjusting the radial velocity of the lens carriage, accordingly. For maximum information storage density over the surface of the disc, there must be equally spacing between successive information tracks (i.e., constant pitch). This can be accomplished by moving the lens carriage radially with a velocity proportional to the angular velocity of the disc. Thus, the lens carriage velocity signal is preferably produced by frequency dividing the succession of reset pulses.

Since the lens carriage velocity signal has a frequency directly proportional to the rate of change of the radius of the selected track the signal can be utilized advantageously to update the measure of radius as the lens carriage is moved radially inwardly or outwardly.

Thus, in accordance with another aspect of the present invention, a measure of the radius of the initial track selected is manually preset into the radius register, and the lens carriage velocity signal is coupled to the clock input of the register, to increment (or decrement) the stored number as the lens carriage is moving radially outwardly (or inwardly). Thus, the digital count stored in the register is always representative of the radius of the particular information track that has been selected.

In accordance with still another aspect of the present invention, the apparatus further includes means for permitting a manual selection of one of two operating modes for rotation of the disc, one a constant linear velocity mode, and the other a constant angular velocity mode. This can be accomplished using a switch coupled to the clock input of the radius register, whereby, when the constant angular velocity mode is desired, the switch can be selectively opened to inhibit the lens carriage velocity signal from incrementiong (or decrementing) the count stored in the register. As a result, the particular count at which the digital counter is reset to its zero state remains unchanged, and a constant frequency for the reset pulses, and, therefore, the disc velocity and lens carriage velocity signals, will be produced.

In an alternative embodiment of the present invention, the count stored in the radius register is updated not by the lens carriage velocity signal, but, rather, by pulses produced by an optical encoder coupled to the lead screw. The frequency of these optical encoder pulses is, like that of the lens carriage velocity signal, directly proportional to the rate of change of the radius of the selected track, so the count will, likewise, always be representative of such radius.

Other aspects and advantages of the present invention will become apparent from the following description of the preferred embodiment, taken in conjunction with the accompanying drawings, which disclose, by way of example, the principles of the invention.

DESCRIPTION OF THE PREFERRED EMBODIMENT

Figure 1:
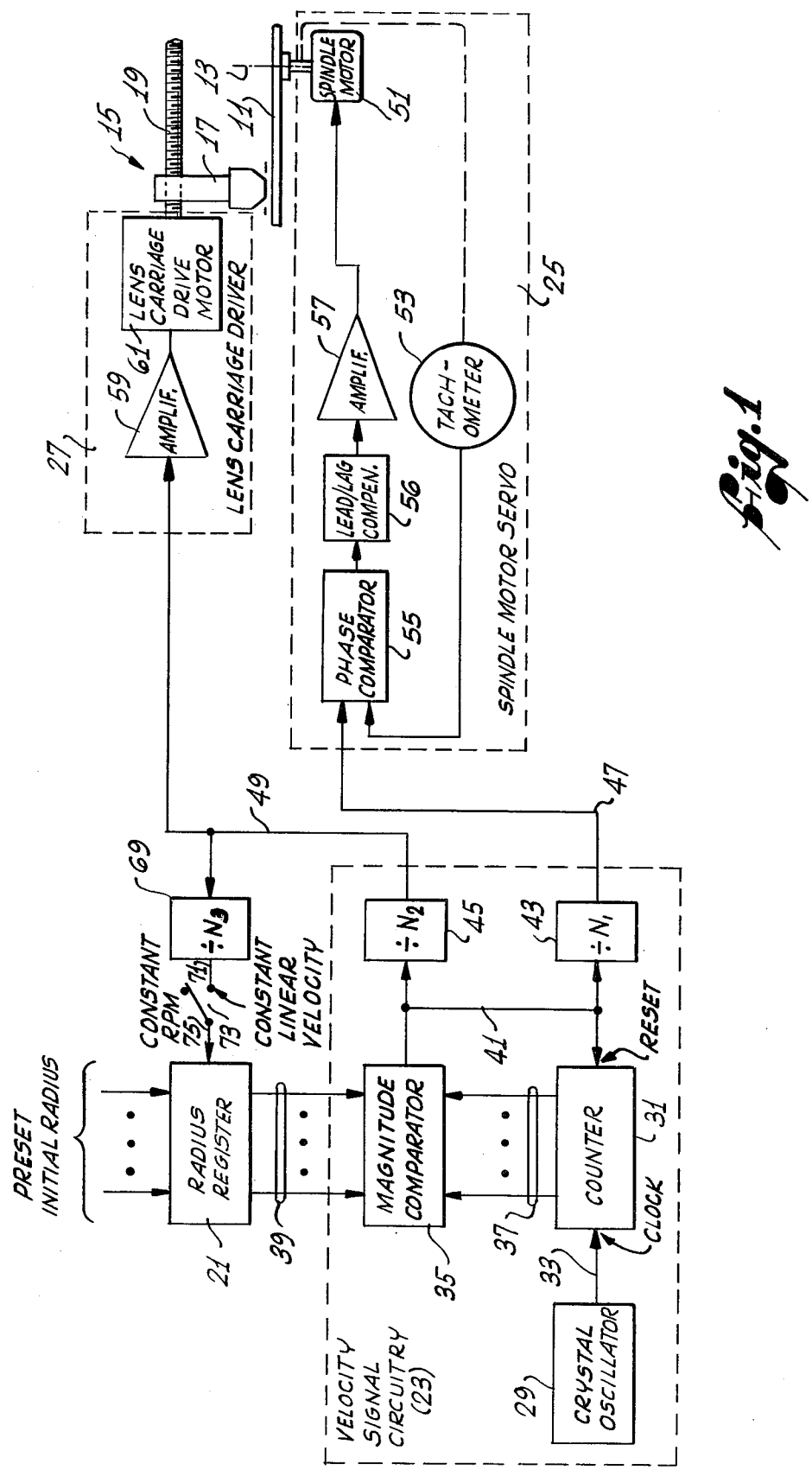
FIG. 1 is a block diagram of a servo apparatus in accordance with the present invention, for rotating an information disc about its central axis to produce a constant linear velocity for the disc relative to an optical transducer.

Referring now to the drawings, and particularly to FIG. 1, there is shown a servo apparatus for rotating an information disc 11 about its central axis 13 at a precisely controlled angular velocity. The disc 11 is rotated relative to an optical transducer 15, which operates to record onto the disc information such as a conventional color television signal frequency modulated on a carrier.

The optical transducer 15 includes means (not shown) for producing a collimated beam of light modulated by the information to be recorded, along with a lens carriage 17, which is controllably movable in a radial direction by a lead screw 19 to direct the beam of light onto a selected portion of the disc 11 as the disc is rotated with respect to it. This produces a series of substantially circular information tracks (not shown)

forming either a spiral or concentric circle pattern on the surface of the disc, each track comprising an alternating sequence of light-reflective and light-scattering regions.

The servo apparatus includes a radius register 21 for storing a digital measure of the radius of the track on which information is currently being recorded, velocity signal circuitry 23 for producing a disc velocity signal having a frequency corresponding to the desired angular velocity of the information disc 11, and a spindle motor servo 25, responsive to the disc velocity signal, for controllably rotating the disc at a corresponding angular velocity. Additionally, the velocity signal circuitry 23 operates to produce a lens carriage velocity signal having a frequency corresponding to the desired radial velocity of the lens carriage 17, and the apparatus further includes a lens carriage driver 27, responsive to the lens carriage velocity signal, for moving the lens carriage, accordingly.

To achieve a uniform density of recorded information over the entire information-bearing surface of the disc 11, the disc must be rotated at a constant linear velocity relative to the lens carriage 17, and the radial distance between adjacent information tracks (i.e., pitch) must be maintained constant. This is accomplished by making the instantaneous frequencies of both the disc velocity signal and the lens carriage velocity signal inversely proportional to the radius of the particular information track being recorded.

The velocity signal circuitry 23 includes a crystal oscillator 29 for producing a clock signal having a substantially constant frequency. In accordance with the invention, both the disc velocity signal and the lens carriage velocity signal are derived from a master pulse signal that is produced by frequency dividing the clock signal by the digital measure of radius stored in the radius register 21. As a result, both velocity signals have frequencies inversely proportional to the radius measure, and the apparatus can operate properly to record information on the disc 11 at a uniformly high recording density, without the need for elaborate initial calibration procedures.

In the preferred embodiment, the velocity signal circuitry 23 includes a digital counter 31 that is clocked by the clock signal supplied on line 33 from the crystal oscillator 29, along with a digital word magnitude comparator 35 that continuously compares the magnitudes of the respective counts stored in the digital counter 31 and the radius register 21, supplied over lines 37 and 39, respectively. Every time it is determined by the magnitude comparator that the two counts are equivalent, a pulse is output on line 41 to reset the digital counter 31 to an initial zero state.

The successive reset pulses produced by the magnitude comparator on line 41 form the aforementioned master pulse signal, from which the disc velocity signal and lens carriage velocity signal are then derived. It will be appreciated that the instantaneous frequency of this master pulse signal is inversely proportional to the measure of radius currently stored in the radius register.

As the lens carriage 17 is moved radially outwardly from the centermost track on the disc 11, the magnitude of the radius count stored in the radius register 21 will be continuously increasing, and additional time will be required for the count in the digital counter 31 to reach that magnitude. Thus, as the current track radius increases, the successive reset pulses in the master pulse signal on line 41 will be increasingly spread out and, likewise, the resultant disc velocity and lens carriage velocity signals, derived therefrom, will have diminishing instantaneous frequencies. The magnitudes of the successive step increases in the measure of radius are preferably small in comparison with the magnitude of measure of radius, itself, so that the spindle motor servo 25 and the lens carriage driver 27 will not operate to produce large accelerations of the disc 11 and the lens carriage 17, respectively.

The master pulse signal is supplied over line 41 to a divide-by-$N_1$ circuit 43, which divides its frequency by an integral factor $N_1$, to produce the disc velocity signal. Similarly, the master pulse signal is supplied to a divide-by-$N_2$ circuit 45, which divides its frequency by an integral factor $N_2$, to produce the lens carriage velocity signal. The particular values for the factors $N_1$ and $N_2$ are selected to produce the prescribed frequencies for the respective velocity signals that enable the spindle motor servo 25 and lens carriage driver 27 to drive the disc 11 and the lens carriage 17 at the proper velocities.

The disc velocity signal and the lens carriage velocity signal are supplied over lines 47 and 49 from the velocity signal circuitry 23 to the spindle motor servo 25 and the lens carriage driver 27, respectively. The servo and the driver both operate in a conventional manner to controllably adjust either the angular velocity of the disc 11 and the radial velocity of the lens carriage 17, according to the instantaneous frequency of the corresponding velocity signal.

The spindle motor servo 25 includes a spindle motor 51 for rotating the disc 11, a tachometer 53 coupled to the spindle motor for producing a tachometer signal having a frequency proportional to its angular velocity, and a phase comparator 55 for comparing the respective phase angles of the tachometer signal and the disc velocity signal. The phase comparator 55 produces a control signal proportional to the phase difference, which is processed by a lead/lag compensator 56 and amplified by an amplifier 57 and, in turn, coupled to the spindle motor 51 to control its angular velocity. The servo 25 operates in a conventional manner to synchronize the respective frequencies and phase angles of the disc velocity signal and the tachometer signal, whereby the angular velocity of the spindle motor 51, and, therefore, the disc 11, are made to follow the varying frequency of the disc velocity signal.

The lens carriage driver 27 includes an amplifier 59 and a synchronous lens carriage drive motor 61. The lens carriage velocity signal, supplied on line 49 from the velocity signal circuitry, is suitably amplified in the amplifier 59 and, in turn, coupled to the motor 61, which turns the lead screw 19 at a corresponding angular velocity. Thus, the radial velocity of the lens carriage 17 will automatically follow the varying frequency of the lens carriage velocity signal.

In the preferred embodiment, the radius register 21 is a digital counter that can be initially manually preset with a count proportional to the radius of the initial track on which information is to be recorded. The count stored in the register is then continuously updated by means of the lens carriage velocity signal, which, as previously discussed, has a frequency proportional to the rate of change of the radius the lens carriage 17. This signal is transmitted over line 49 from the velocity signal circuitry 23 to a divide-by-$N_3$ circuit 69, where it is frequency divided by an integral factor $N_3$, and transmitted over line 71 to a mode switch 73, and, in turn, over line 75 to the CLOCK input terminal of the radius register 21. The radius count stored in the register is thus continuously updated as the lens carriage 17 is moved radially with respect to the disc 11. The divide-by-$N_3$ circuit 69 is utilized to suitably frequency divide the encoder signal to achieve a properly scaled frequency for updating the radius count. If the lens carriage 17 is moved radially outwardly by the lens carriage driver 27, the count in the radius register 21 is incremented by the lens carriage velocity signal, whereas, if the carriage is moved radially inwardly, the count is decremented.

Figure 2:
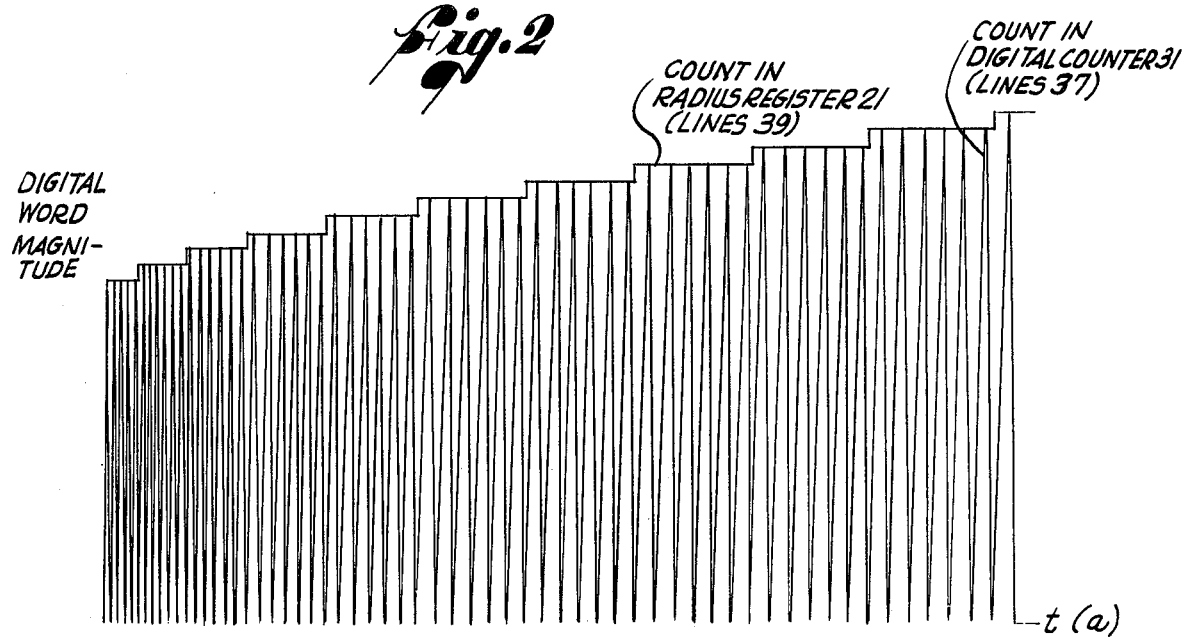
FIGS. 2(a)-2(e) together constitute a simplified timing diagram (not necessarily to scale) showing various timing signals produced by the apparatus of FIG. 1.
Figure 2:
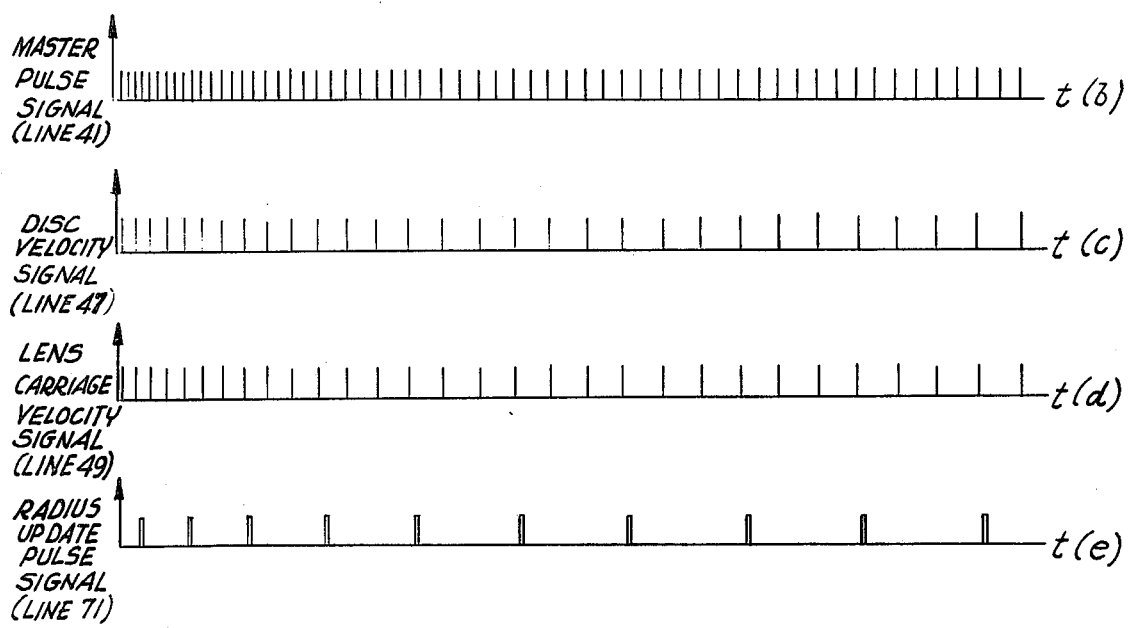

Referring now to FIG. 2 of the drawings, FIG. 2(a) shows, in simplified form, the magnitude of the count stored in the digital counter 31, along with the radius count stored in the radius register 21, both counts varying with time. It will be noted that the count registered in the digital counter increases linearly with time until it reaches the level of the radius count, at which time it is reset to its initial zero count by a reset pulse (FIG. 2(b)) from the magnitude comparator 35. This counting and resetting process is continuously repeated as long as the apparatus continues to operate, whereby the succession of reset pulses, forming the master pulse signal on line 41 is produced.

FIGS. 2(c) and 2(d) depict the disc velocity signal and the lens carriage velocity signal, which are produced by the divide-by-$N_1$ and the divide-by-$N_2$ circuits, 43 and 45, respectively, for transmission over lines 47 and 49 to the spindle motor servo 25 and the lens carriage driver 27, respectively. It will noted that, for simplicity, both of these velocity signals have instantaneous frequencies equal to one half of the instantaneous frequency of the master pulse signal produced by the magnitude comparator 35 (i.e., $N_1=N_2=2$). It should be appreciated, however, that the actual values selected for the factors $N_1$ and $N_2$ will depend upon a number of factors, including the frequency of the crystal oscillator 29, the resolution of the radius register 21, and characteristics of the spindle motor servo 25 and the lens carriage driver 27.

Referring again to FIG. 1, the lens carriage velocity signal is supplied over line 49 to the divide-by-$N_3$ circuit 69, which divides the instantaneous frequency of the signal by the factor $N_3$ to produce radius update pulses (FIG. 2(e)) for transmission to the radius register 21. The count stored in the radius register is thus updated to reflect the current radius of the track on which information is being recorded. As shown in FIG. 2(a), a staircase-like radius count will result.

In accordance with another aspect of the present invention, the radius update pulses produced by the divide-by-$N_3$ circuit 69 are coupled through the mode switch 73, which permits a manual selection of an operating mode for the apparatus. With the switch closed, the pulses are transmitted to the radius register 75 and the apparatus will function as previously described to produce a constant linear velocity for the information disc 11 relative to the lens carriage 17. With the switch opened, on the other hand, the transmission of pulses to the radius register 21 is prevented, so the count stored in the register remains unchanged. As a result, the instantaneous frequency of the reset pulses forming the master pulse signal on line 41 remains constant, and, likewise, the respective frequencies of the disc velocity signal and the lens carriage velocity signal remain unchanged. A constant angular velocity for the disc 11 will thereby result.

In an alternative embodiment of the present invention (not shown), the apparatus includes an optical encoder coupled to the lead screw 19 for producing a signal having a frequency proportional to the radial velocity of the lens carriage 17. The optical encoder signal, rather than the lens carriage velocity signal, is then coupled to the divide-by-$N_3$ circuit 69 to produce the radius update pulses (FIG. 2(e)).

From the foregoing description, it should be apparent that the present invention provides an effective servo apparatus for precisely controlling the angular velocity of an information storage disc relative to an optical transducer for recording information thereon. The apparatus can operate to rotate the information disc at a substantially constant linear velocity relative to the transducer, without being susceptible to velocity changes due to component drifts, and without requiring elaborate initial calibration procedures, whereby a uniformly high density of information can be recorded over the entire information-bearing surface of the disc.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

We claim:

1. Apparatus for rotating an information storage disc relative to a transducer, said disc having a plurality of substantially circular and concentrically arranged information tracks, wherein said transducer is radially movable relative to said disc to be positioned in a prescribed relationship relative to a selected one of said tracks, and the relative angular velocity of the information disc is controllably varied according to the radius of the selected information track, said apparatus comprising:

means for producing a digital measure of the radius of the particular information track selected;

oscillator means for producing a clock signal having a substantially constant frequency;

means, responsive to the radius measure and the clock signal, for producing a disc velocity signal that has an instantaneous frequency corresponding to the frequency of the clock signal divided by the radius measure; and means for adjusting the angular velocity of the information disc according to the instantaneous frequency of the disc velocity signal.

2. Apparatus as defined in claim 1, wherein the magnitude of said digital radius measure is substantially directly proportional to the radius of the selected information track, whereby the angular velocity of the disc is maintained substantially inversely porportional to the radius of the selected track and the disc is moved at a substantially constant linear velocity relative to the transducer.

3. Apparatus as defined in claim 2, wherein said means for producing a digital measure of radius includes:

a digital radius register for storing the radius measure;

means for loading an initial digital word into said register, said initial word having a magnitude that corresponds to the radius of the initial information track selected; and means for producing a signal indicative of radial movement of the transducer relative to the information disc, for use in updating the count stored in said radius register, whereby the digital word stored therein is continuously indicative of the radius of the selected track.

4. Apparatus as defined in claim 1, wherein said means for producing a disc velocity signal includes:
digital counter means for continuously counting the successive cycles of the clock signal;
digital comparator means for comparing the magnitude of the count stored in said digital counter means to the magnitude of the radius measure; and
means for producing a signal to reset said digital counter means to an initial state every time it is determined by said digital comparator means that the respective magnitudes are equivalent, whereby the instantanteous frequency of the reset signal is inversely proportional to the magnitude of the radius measure.

5. Apparatus as defined in claim 4, wherein said means for producing a disc velocity signal further includes:
means for frequency dividing the reset signal to produce the disc velocity signal.

6. Apparatus as defined in claim 1, further including:
means, responsive to the radius measure and the clock signal, for producing a transducer velocity signal having an instantaneous frequency proportional to that of the disc velocity signal; and
means for adjusting the radial velocity of the transducer relative to the information disc according to the instantaneous frequency of the transducer velocity signal.

7. Apparatus as defined in claim 6, wherein the transducer operates to record information in a sequential fashion on successive information tracks on the disc.

8. Apparatus for recording information on an information disc in a plurality of substantially circular and concentrically arranged information tracks, wherein the successive information tracks are substantially equally-spaced with respect to each other, and the density of information recorded on each track is substantially constant, said apparatus comprising:
means for rotating the information disc about its central axis at a controllable angular velocity;
transducer means controllably movable in a radial direction relative to the information disc to record the information on a selected information track;
means for producing a digital measure of the radius of the selected information track;
oscillator means for producing a clock signal having a substantially constant frequency;
velocity signal means, responsive to the clock signal and the digital measure of radius, for producing a disc velocity signal and a transducer velocity signal, both of said signals having frequencies proportional to the frequency of the clock signal divided by the measure of radius; and
means for controllably moving said transducer means at a radial velocity corresponding to the frequency of the transducer velocity signal, whereby such velocity is inversely proportional to the radius of the particular track being recorded;
said means for rotating the disc operates to rotate the disc at an angular velocity corresponding to the frequency of the disc velocity signal, whereby the disc is moved at a constant linear velocity relative to said transducer means, and information is recorded on the disc at the same recording density for all of the information tracks.

9. Apparatus as defined in claim 8, wherein said means for producing a digital measure of radius includes:
a digital radius register for storing the radius measure;
means for loading an initial digital word into said register, said initial word having a magnitude that corresponds to the radius of the initial information track recorded by said transducer means; and
means for producing a transducer signal indicative of radial movement of said transducer means relative to the information disc, for use in updating the count stored in said radius register, whereby the digital word stored therein is continuously indicative of the radius of the information track currently being recorded.

10. Apparatus as defined in claim 9, wherein said means for producing a transducer signal includes an encoder coupled to said transducer means.

11. Apparatus as defined in claim 9, wherein said transducer signal comprises the transducer velocity signal.

12. Apparatus as defined in claim 8, further including:
switch means for permitting a manual selection between a first operating mode, wherein the information disc is rotated at a constant linear velocity relative to said transducer means, and a second operating mode, wherein the information disc is rotated at a constant angular velocity.

13. Apparatus as defined in claim 12, wherein:
said switch means includes means for selectively preventing the transducer signal from updating the count stored in said radius register, whereby said count remains constant and, likewise, the frequencies of the respective disc velocity and transducer velocity signals remain constant.

14. Apparatus as defined in claim 8, wherein said velocity signal means includes:
digital counter means for continuously counting the successive cycles of the clock signal;
digital comparator means for comparing the magnitude of the count stored in said digital counter means to the magnitude of the radius measure; and
means for producing a signal to reset said digital counter means to an initial state every time it is determined by said digital comparator means that the respective magnitudes are equivalent, whereby the instantaneous frequency of the reset signal is inversely proportional to the magnitude of the radius measure.

15. Apparatus as defined in claim 14, wherein said velocity signal means further includes:
means for frequency dividing the reset signal to produce the disc velocity signal and the transducer velocity signal.

16. A method of rotating an information storage disc relative to a transducer, said disc having a plurality of substantially circular and concentrically arranged information tracks, wherein said transducer is radially movable relative to said disc to be positioned in a prescribed relationship relative to a selected one of said tracks, and the relative angular velocity of the information disc is controllably varied according to the radius of the selected information track, said method comprising the steps of:
producing a digital measure of the radius of the particular information track selected;
generating a clock signal having a substantially constant frequency;

dividing the frequency of the clock signal by the measure of radius to produce a disc velocity signal; and adjusting the angular velocity of the information disc according to the instantaneous frequency of the disc velocity signal.

17. A method as defined in claim 16, wherein the magnitude of said digital radius measure is substantially directly proportional to the radius of the selected information track, whereby the angular velocity of the disc is maintained substantially inversely proportional to the radius of the selected track and the disc is moved at a substantially constant linear velocity relative to the transducer.

18. A method as defined in claim 17, wherein said step of producing a measure of radius includes the steps of:

storing an initial digital word having a magnitude corresponding to the radius of the initial information track selected; and monitoring relative radial movement of the transducer and continuously updating the digital word being stored, whereby such word is continuously indicative of the radius of the selected information track.

19. A method as defined in claim 16, wherein said step of dividing includes the steps of:

continuously counting the successive cycles of the clock signal and storing such count in a digital counter;

comparing the magnitude of the count stored in said digital counter to the magnitude of the radius measure;

producing a reset signal to reset the digital counter to an initial state every time it is determined in said step of comparing that the respective magnitudes are equal, whereby the instantaneous frequency of the reset signal is inversely proportional to the magnitude of the radius measure.

20. A method as defined in claim 19, wherein said step of dividing further includes the step of:

frequency dividing the reset signal to produce the disc velocity signal.

21. A method as defined in claim 16, further including the steps of:

producing a transducer velocity signal having an instantaneous frequency proportional to that of the disc velocity signal; and adjusting the radial velocity of the transducer relative to the information disc according to the instantaneous frequency of the transducer velocity signal.

22. A method as defined in claim 21, wherein the transducer operates to record information in a sequential fashion on successive information tracks on the disc.

23. Apparatus for recording information on an information disc in a plurality of substantially circular and concentrically arranged information tracks, wherein the successive information tracks are substantially equally-spaced with respect to each other, and the density of information recorded on each track is substantially constant, said apparatus comprising:

means for rotating the information disc about its central axis at a controllable angular velocity;

transducer means controllably movable in a radial direction relative to the information disc to record the information on a selected information track;

means for producing a digital measure of the radius of the selected information track, including a digital radius register for storing the radius measure, means for loading an initial digital word into said register, said initial word having a magnitude that corresponds to the radius of the initial information track recorded by said transducer means, and means for producing a transducer signal indicative of radial movement of said transducer means relative to the information disc, for use in updating the count stored in said radius register, whereby the digital word stored therein is continuously indicative of the radius of the information track currently being recorded;

oscillator means for producing a clock signal having a substantially constant frequency;

velocity signal means, responsive to the clock signal and the digital measure of radius, for producing a disc velocity signal and a transducer velocity signal, said velocity signal means including digital counter means for continuously counting the successive cycles of the clock signal, digital comparator means for comparing the magnitude of the count stored in said digital counter means to the magnitude of the radius measure, means for producing a signal to reset said digital counter means to an initial state every time it is determined by said digital comparator means that the respective magnitudes are equivalent, whereby the instantaneous frequency of the reset signal is inversely proportional to the magnitude of the radius measure, and means for frequency dividing the reset signal to produce the disc velocity signal and the transducer velocity signal; and means for controllably moving said transducer means at a radial velocity corresponding to the frequency of the transducer velocity signal, whereby such velocity is inversely proportional to the radius of the particular track being recorded;

said means for rotating the disc operating to rotate the disc at an angular velocity corresponding to the frequency of the disc velocity signal, whereby the disc is moved at a constant linear velocity relative to said transducer means, and information is recorded on the disc at the same recording density for all of the information tracks.

* * * * *